United States Patent
Wagner et al.

(10) Patent No.: US 6,627,078 B1
(45) Date of Patent: Sep. 30, 2003

(54) FILTER ELEMENT COVER GRIP

(75) Inventors: Brian K. Wagner, Stoughton, WI (US); Kwok-Lam Ng, Madison, WI (US); Robert A. Bannister, Stoughton, WI (US); Tao You, Madison, WI (US)

(73) Assignee: Nelson Industries, Inc., Stoughton, WI (US)

( * ) Notice: Subject to any disclaimer, the term of this patent is extended or adjusted under 35 U.S.C. 154(b) by 0 days.

(21) Appl. No.: 09/934,508

(22) Filed: Aug. 22, 2001

(51) Int. Cl.[7] .............................................. B01D 35/34
(52) U.S. Cl. ...................... 210/238; 210/454; 210/470
(58) Field of Search ................................ 210/238, 438, 210/454, 470, 232

(56) References Cited

U.S. PATENT DOCUMENTS

| | | |
|---|---|---|
| 4,906,365 A | 3/1990 | Baumann et al. |
| 5,695,633 A | 12/1997 | Ernst et al. .................. 210/130 |
| 6,235,194 B1 * | 5/2001 | Jousset ........................ 210/206 |

FOREIGN PATENT DOCUMENTS

| | | | |
|---|---|---|---|
| DE | 43 44 588 | 6/1995 | |
| DE | 4344588 | * 6/1995 | ........... B01D/27/08 |
| EP | 1008375 | 6/2000 | |
| GB | 2 307422 | 5/1997 | |

* cited by examiner

*Primary Examiner*—Matthew O. Savage
(74) *Attorney, Agent, or Firm*—Andrus, Sceales, Starke & Sawall, LLP

(57) ABSTRACT

A filter (20) has a removable cover (30) releasably engaging and gripping an end cap (40) of a filter element (34) including upon removal from the filter housing (22). The cover has a plurality of axially extending cantilever legs (102, 104) gripping a mushroom-shaped boss (118) on the end cap.

2 Claims, 6 Drawing Sheets

FILTER ELEMENT COVER GRIP

BACKGROUND AND SUMMARY OF THE INVENTION

The invention relates to filters, and more particularly to a filter element cover grip combination facilitating easy removal.

Filters are typically serviced by removing a cover and then removing the replaceable filter element from the filter housing, but usually with extensive human contact with the filter element, which is undesirable because of the mess, etc. It is known in the prior art to provide a filter assembly having a cover snapped onto the outside diameter of the filter element, however such snap-fit mechanism damages the filter media of the element. It is also known to provide a filter support tube and housing cover with snap detent connection therebetween, for example U.S. Pat. No. 5,695,633.

The present invention provides a simple and effective cover and filter element grip combination. The filter element is snapped into the cover and can be assembled and disassembled to the filter housing. The cover when inverted acts as a drip pan for the element. Minimal human contact is required.

DETAILED DESCRIPTION

Figure 1:
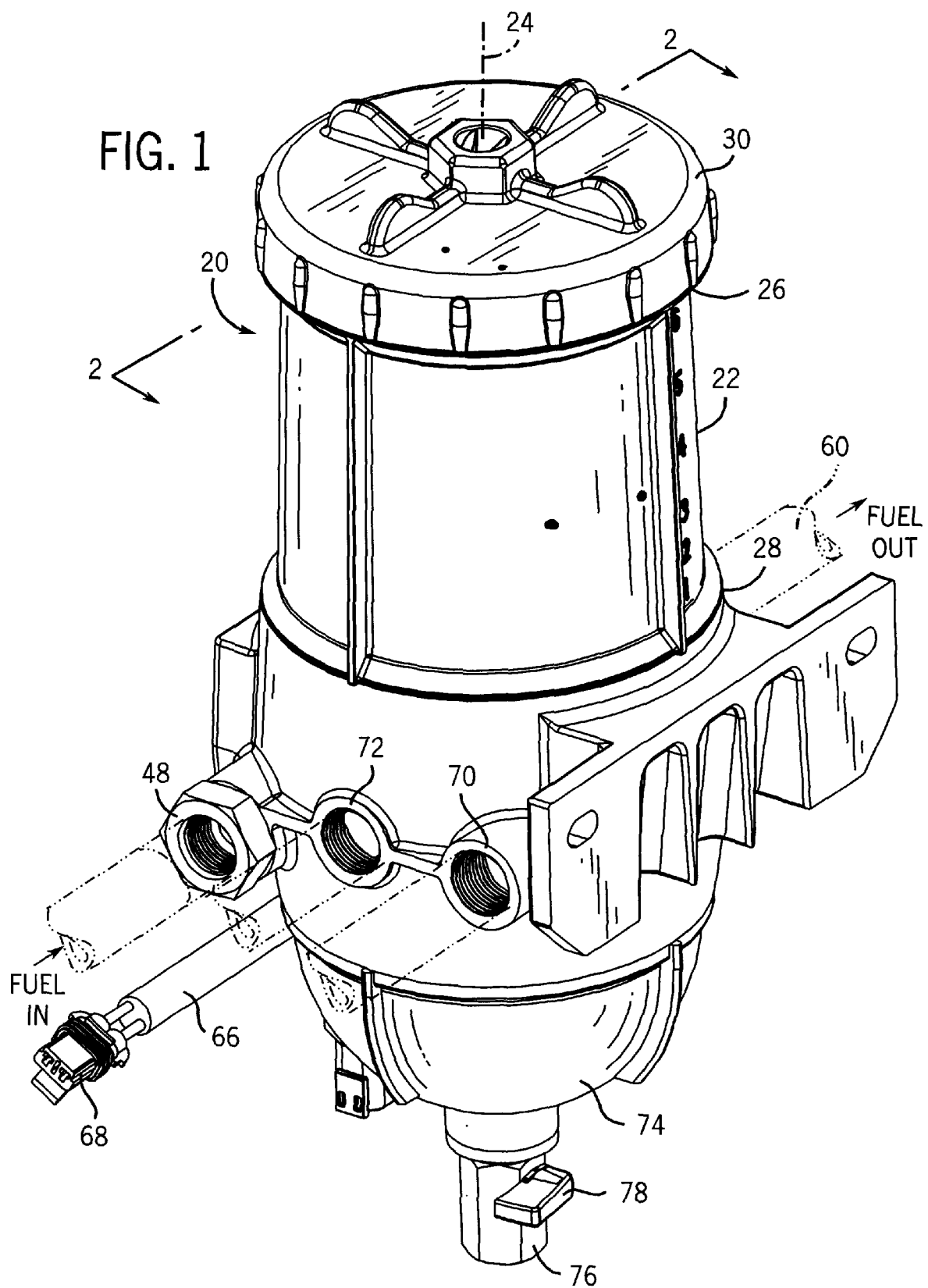
FIG. 1 shows a filter known in the prior art, except for the internal filter element cover grip combination.
Figure 2:
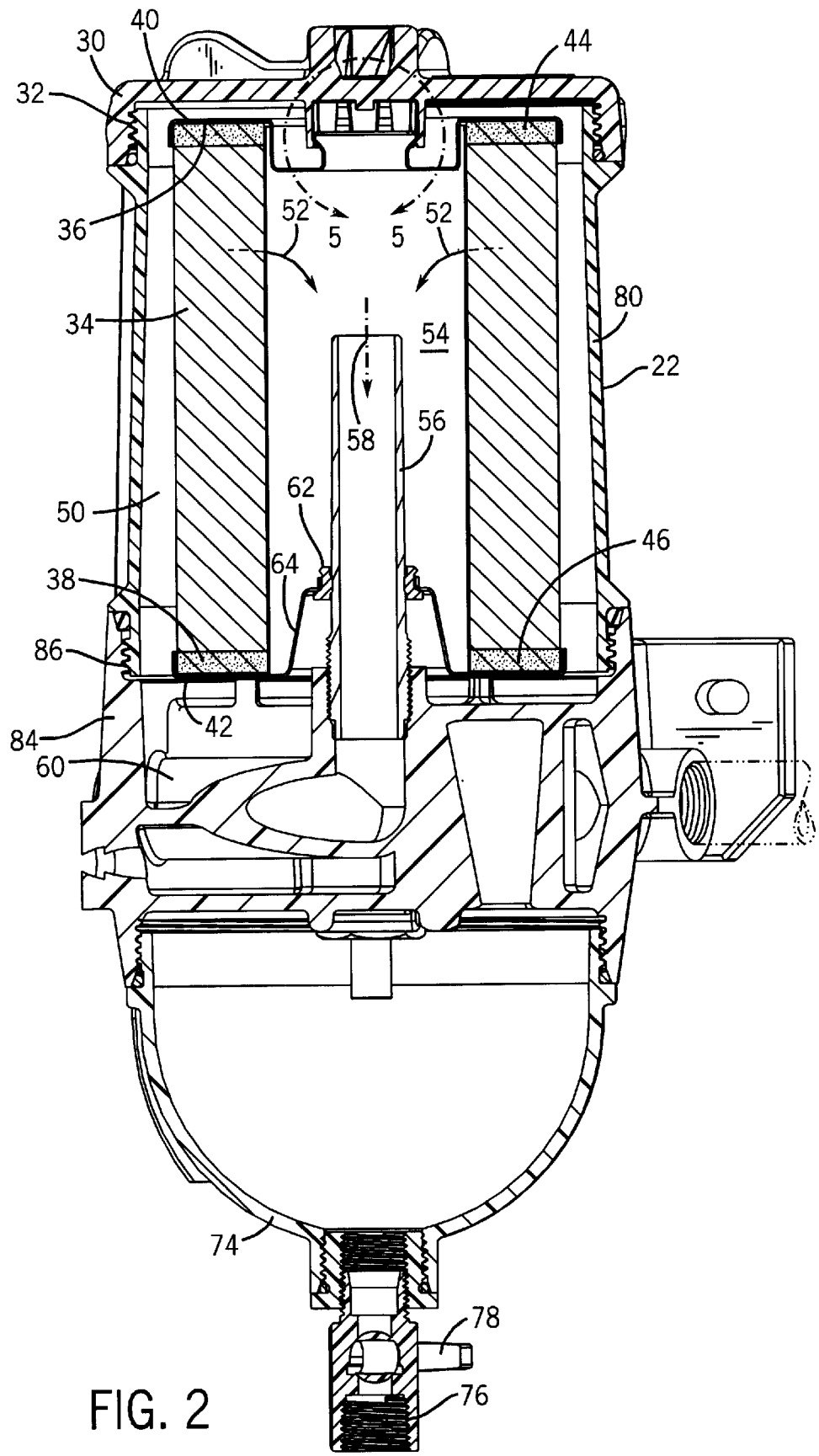
FIG. 2 is a sectional view taken along line 2—2 of FIG. 1 and illustrating the filter element cover grip combination in accordance with the present invention.
Figure 3:
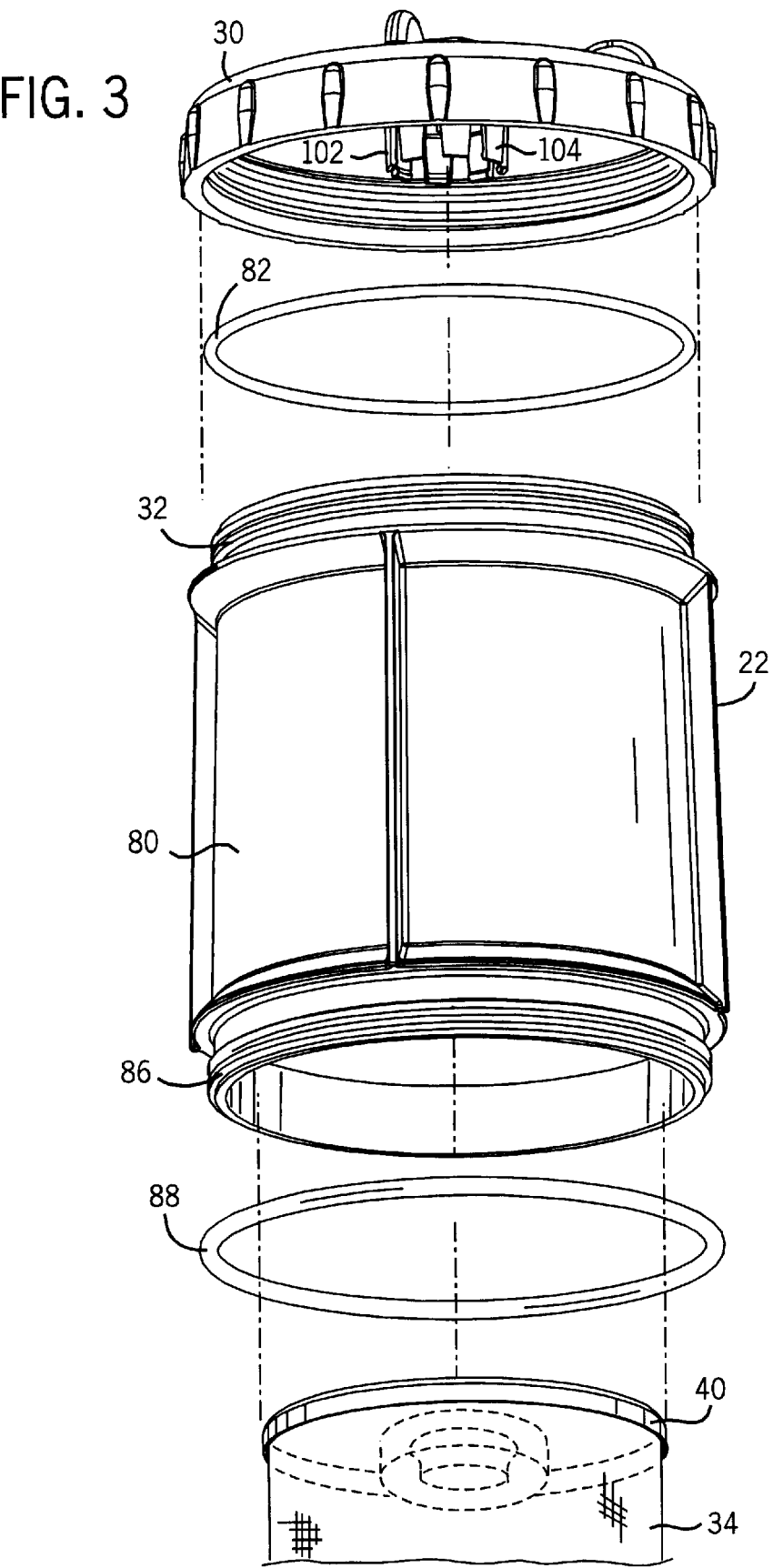
FIG. 3 is an exploded perspective view of a portion of FIG. 2.

FIG. 1 shows a filter 20, which in disclosed form is a diesel fuel filter, though the invention is not limited thereto. The filter includes a housing 22 extending axially along an axis 24 between distally opposite first and second ends 26 and 28. A cover 30 is removably mounted to the housing and closes first end 26. Cover 30 is preferably threadingly mounted at threads 32, FIG. 2, to the housing and is rotatable about axis 24. As is known, an annular filter element 34, FIG. 2, extends axially in the housing between distally opposite first and second ends 36 and 38 respectively at first and second ends 26 and 28 of filter housing 22. First and second end caps 40 and 42 are permanently and sealingly mounted to respective ends 36 and 38 of the filter element, for example by being potted thereto by potting material such as 44 and 46, as is known. End cap 40 is releasably engaged and gripped by cover 30, including upon removal of cover 30 from housing 22, to be described. The remainder of filter 20 is conventional, and will be only briefly described. Filter 20 has a diesel fuel inlet 48, FIG. 1, receiving liquid to be filtered, which liquid flows into annular space 50, FIG. 2, in the housing, then radially inwardly through filter element 34 as shown at arrows 52, into hollow interior 54 of the filter element, then axially through outlet tube 56 as shown at arrow 58, then through fuel outlet 60, FIG. 1. Outlet tube 56 is sealed at grommet 62 to inner portion 64 of end cap 42. A heater cable 66 and electrical plug 68 may be provided for heating the fuel, particularly diesel fuel. Further heating of the fuel, particularly at engine start-up, may be provided by a water jacket around the housing having an inlet 70 and an outlet 72. A collection bowl or reservoir 74 collects coalesced liquid and contaminant from the fuel, for drainage at drain plug 76 as controlled by drain valve 78. Further as is known, filter housing 22 is provided with a transparent or clear housing sidewall at 80, FIGS. 2, 3, for visual inspection of the fuel level in annular space 50, as an indication of pressure drop across the filter element, i.e. the higher the fuel level the greater the pressure drop, and hence an indicator of an oncoming need for a filter element change. Annular sidewall 80 of filter housing 22 is thread mounted at threads 32 to cover 30 and sealed thereto at O-ring 82, and is thread mounted to base 84 at threads 86 and sealed thereto at O-ring 88. The construction thus far described is known in the prior art.

Figure 10:
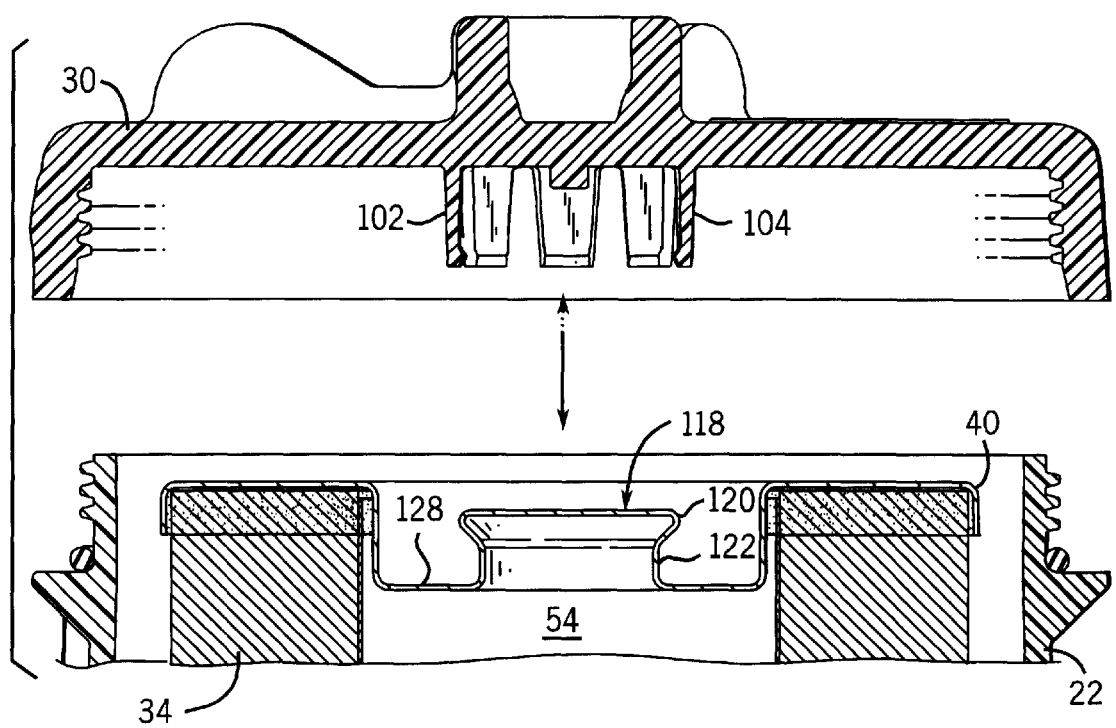
FIG. 10 is a view like FIG. 9 and further illustrating assembly.

Cover 30 has a plurality of axially extending cantilever legs 102, 104, etc., FIGS. 3–9, gripping end cap 40 in detent relation, with the legs being deflectable radially outwardly to release end cap 40. The legs have fixed root ends such as 106, 108, FIG. 5, at cover 30, and extend axially into the housing to inner free ends 110, 112 having radially inwardly pointing feet 114, 116. End cap 40 has a mushroom-shaped boss 118, FIGS. 6, 10, with a head 120 of a first outer diameter and facing cover 30, and a trunk 122 of an outer diameter smaller than the outer diameter of head 120 and extending axially from head 120 on the opposite side thereof from cover 30. Cover 30 and mushroom-shaped boss 118 are axially engageable, FIGS. 6, 8, 9, 10, with feet 114, 116 sliding axially along head 120 and with legs 102, 104 deflecting radially outwardly, as shown at arrow 124, FIG. 8, and then with feet 114, 116 sliding axially past head 120 as boss 118 slides between legs 102, 104 and axially toward cover 30 as shown at arrow 126, and then with legs 102, 104 deflecting back radially inwardly with feet 114, 116 behind head 120, FIG. 5, on the axially opposite side thereof from cover 30. Legs 102, 104, etc. loosely radially grip boss 118 and slide circumferentially along head 120 during rotation of cover 30 during both installation and removal, and grip boss 118 to axially pull filter element 34 out of the housing during removal.

Figure 4:
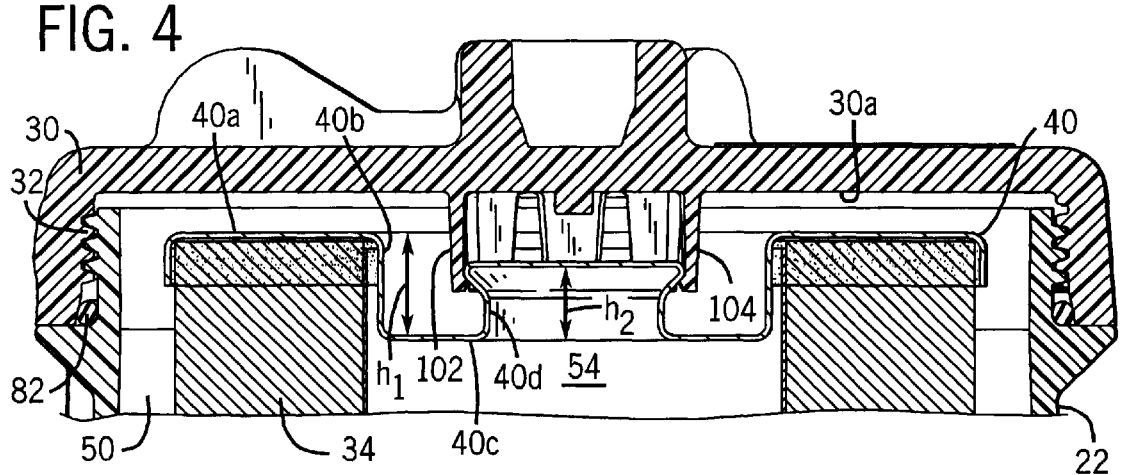
FIG. 4 is an enlarged view of a portion of FIG. 2.
Figure 5:
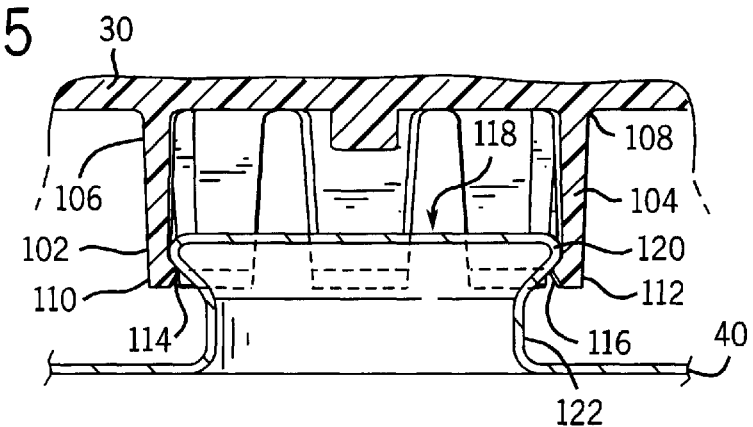
FIG. 5 is a further enlarged view of a portion of FIG. 2.
Figure 9:
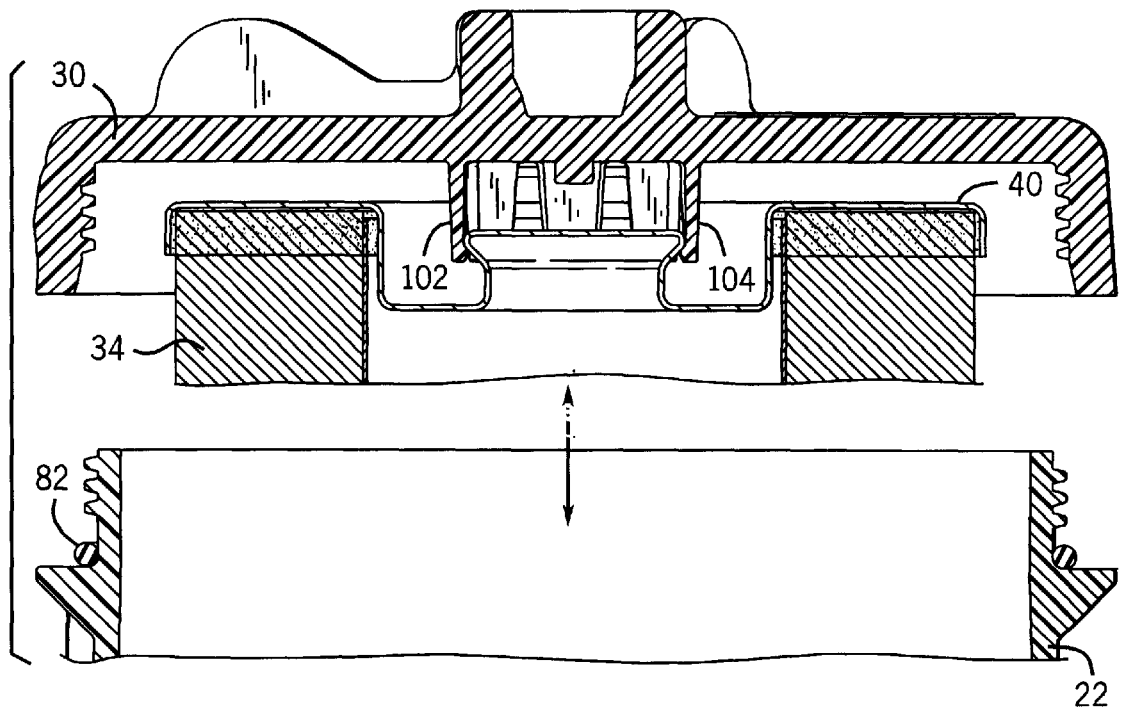
FIG. 9 is a view like FIG. 4 and illustrating assembly.
Figure 6:
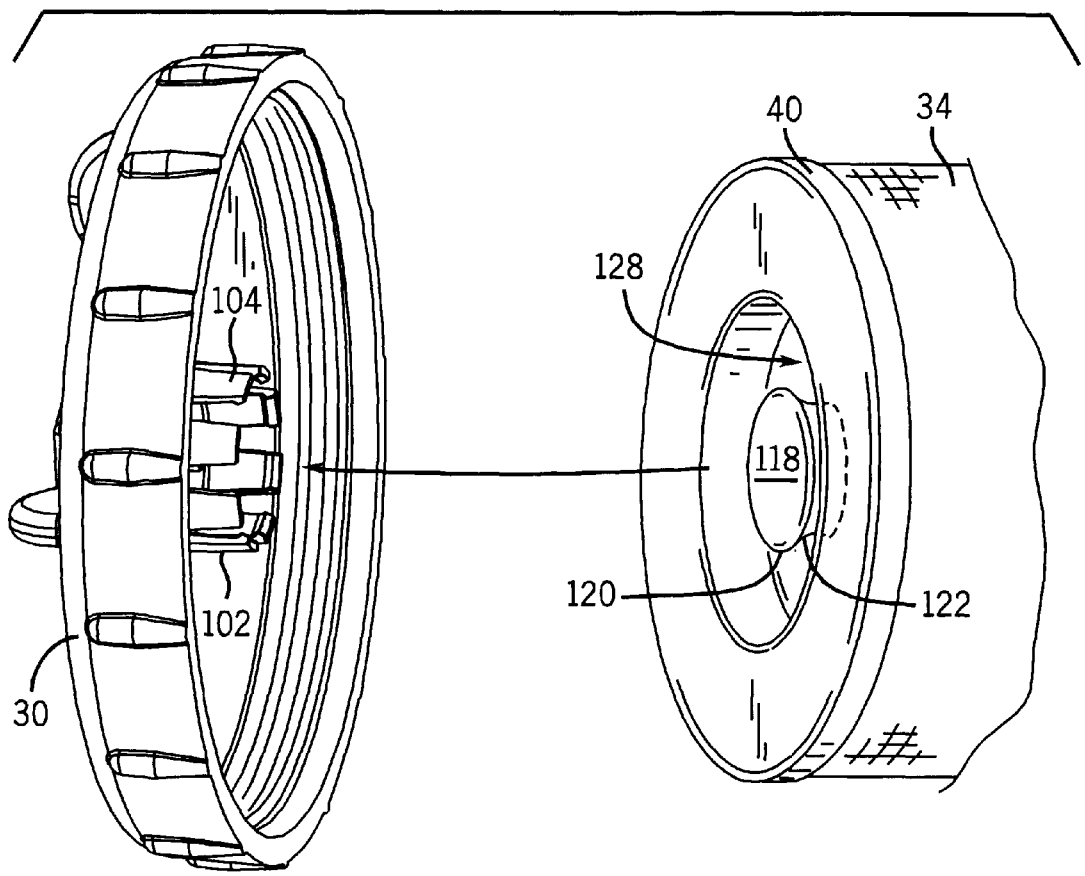
FIG. 6 is an exploded perspective view illustrating assembly.
Figure 8:
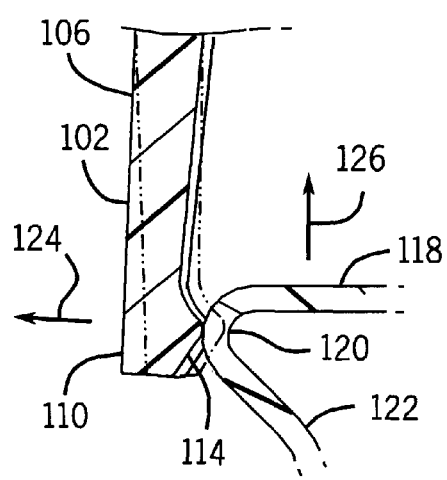
FIG. 8 is a view like a portion of FIG. 5 and illustrating assembly.
Figure 7:
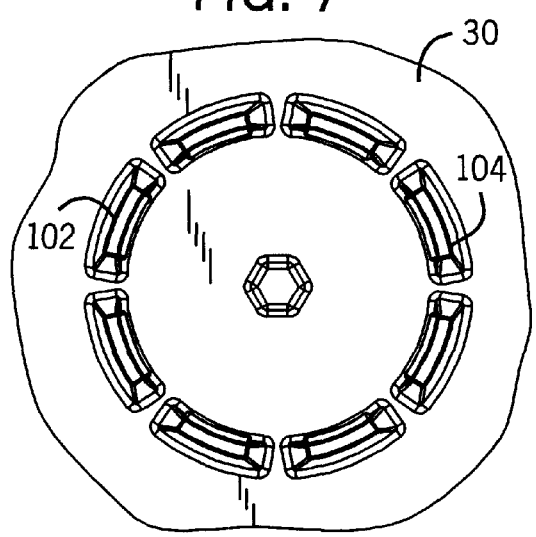
FIG. 7 is an inside end view of the cover of FIG. 6.
Figure 11:
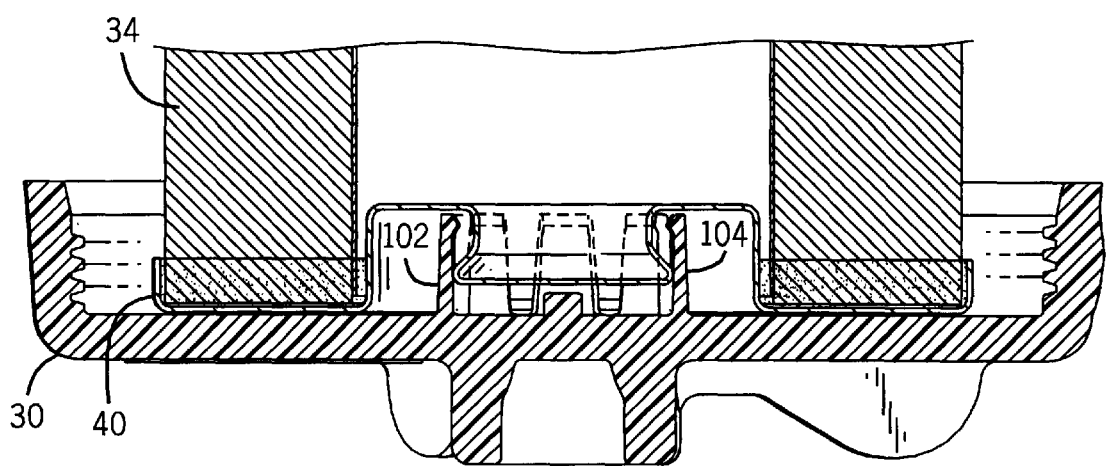
FIG. 11 is a view like FIG. 4 inverted.

Legs 102, 104, etc. extend axially into housing 22 to an inner axial reach at free ends 110, 112 beyond the noted first end 36 of filter element 34, and grip end cap 40 mushroom-shaped boss 118. Filter element 34 has the noted hollow interior 54 which is spanned and closed by end cap 40 at first end 36. End cap 40 has a central concave section 128, FIGS. 6, 10, extending into hollow interior 54. Legs 102, 104, etc. extend into concave section 128 and engage the end cap at mushroom-shaped boss 118 in detent relation as above described. As shown in FIG. 4, the end cap 40 has a first section 40a including an outer annulus at the first end 36 of the filter element and extending laterally relative a central axis of the housing, a second section 40b including cylindrical sidewall extending axially into the hollow interior 54 from the first section, a third section 40c extending laterally inward from the second section, and a fourth section 40d including the central mushroomed-shaped boss 118 extending axially toward the cover 30 to a head 120. The second section has a first axial height along the central sidewall between the first section and the third section, and the fourth section has a second axial height along the mushroom-shaped boss between the third section and the head. The second axial height is less than the first axial height such that an inner lateral surface 30a of the cover 30 can contact the outer annulus of the end cap as shown in FIG. 11. In addition, the legs 102, 104 extend axially to a third height wherein the third axial height is less than the first axial height also permitting the inner lateral surface of the cover to contact the outer annulus of the end cap as shown in FIG. 11. Filter element 34 at end cap 40 may be mounted to cover 30 before or after insertion into housing 22. Upon removal, filter element 34 at end cap 40 is axially pulled from the housing by legs 102, 104 at feet 114, 116. After removal, the end cap and filter element may be inverted, FIG. 11, such that the cover provides a drip pan for the diesel fuel oil.

It is recognized that various equivalents, alternative and modifications are possible within the scope of the appended claims.

What is claimed is:

1. A filter comprising a housing extending axially along an axis between distally opposite first and second ends, a cover removably mounted to said housing and closing said first end, an annular filter element extending axially in said housing between distally opposite first and second ends respectively at said first and second ends of said housing, an end cap at said first end of said filter element and releasably engaged and gripped by said cover including upon removal of said cover from said housing, said cover having a plurality of cantilever legs extending axially into said housing to an inner axial reach beyond said first end of said filter element and gripping said end cap, wherein said filter element has a hollow interior, said end cap has a central concave section extending into said hollow interior, said legs extend into said concave section, said end cap spans and closes said hollow interior and is engaged by said legs in said concave section in detent relation, said end cap has a central mushroom-shaped boss extending from said concave section axially toward said cover, and wherein said end cap has a first section comprising an outer annulus at said first end of said filter element and extending laterally relative to said axis, a second section comprising a cylindrical sidewall extending axially into said hollow interior from said first section, a third section extending laterally inwardly from said second section, and a fourth section comprising said central mushroom-shaped boss extending axially from said third section toward said cover to a head, said second section having a first axial height along said cylindrical sidewall between said first section and said third section, said fourth section having a second axial height along said mushroom-shaped boss between said third section and said head, wherein said second axial height is less than said first axial height, such that an inner lateral surface of said cover can contact said outer annulus of said end cap.

2. The filter according to claim 1 wherein said legs extend axially to a third axial height, and wherein said third axial height is less than said first axial height.

* * * * *